(12) United States Patent
Nickel

(10) Patent No.: US 11,591,020 B1
(45) Date of Patent: Feb. 28, 2023

(54) NAVIGATION INFRASTRUCTURE FOR MOTOR VEHICLES

(71) Applicant: Janice H. Nickel, Pacifica, CA (US)

(72) Inventor: Janice H. Nickel, Pacifica, CA (US)

( * ) Notice: Subject to any disclaimer, the term of this patent is extended or adjusted under 35 U.S.C. 154(b) by 0 days.

(21) Appl. No.: 15/260,266

(22) Filed: Sep. 8, 2016

(51) Int. Cl.
| | |
|---|---|
| *B62D 15/02* | (2006.01) |
| *G01C 21/26* | (2006.01) |
| *G05D 1/02* | (2020.01) |
| *H01Q 1/32* | (2006.01) |
| *G06K 7/10* | (2006.01) |

(52) U.S. Cl.
CPC ......... *B62D 15/0255* (2013.01); *G01C 21/26* (2013.01); *G05D 1/0259* (2013.01); *G06K 7/10366* (2013.01); *H01Q 1/32* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 4,815,890 | A * | 3/1989 | Duncan | E01F 9/529 404/15 |
| 5,347,456 | A * | 9/1994 | Zhang | G05D 1/0261 701/23 |
| 6,129,025 | A * | 10/2000 | Minakami | B60L 13/03 104/88.01 |
| 6,157,320 | A * | 12/2000 | Yujiri | E01F 9/30 340/901 |
| 6,758,089 | B2 * | 7/2004 | Breed | G08G 1/096783 73/146 |
| 8,175,796 | B1 | 5/2012 | Blackburn | |
| 8,311,730 | B2 | 11/2012 | Neff | |
| 8,447,239 | B1 * | 5/2013 | Berry | H04B 7/2606 455/73 |
| 2002/0169533 | A1 | 11/2002 | Browne et al. | |
| 2005/0030201 | A1 * | 2/2005 | Bridgelall | G06K 7/0008 340/870.11 |
| 2006/0177265 | A1 * | 8/2006 | Cummings | E01F 9/30 404/9 |
| 2008/0228400 | A1 | 9/2008 | Wheeler | |
| 2008/0297401 | A1 * | 12/2008 | Nishida | G01S 3/18 342/147 |

(Continued)

FOREIGN PATENT DOCUMENTS

| | | | | |
|---|---|---|---|---|
| CN | 203759873 U | * | 8/2014 | |
| JP | 2008128728 A | | 6/2008 | |
| WO | WO 2005071597 A1 | * | 8/2005 | ............... G01S 1/68 |
| WO | 2009106920 A2 | | 9/2009 | |
| WO | WO 2013160716 A1 | * | 10/2013 | ......... G01R 31/2875 |

OTHER PUBLICATIONS

Bouzakis, Antonios et al., Position Tracking for Passive UHF RFID Tags with the Aid of a Scanned Array, Int J Wireless Inf Networks (2013) 20:318-327, DOI 10.1007/s10776-013-0210-z (https://link.springer.com/content/pdf/10.1007/s10776-013-0210-z.pdf) Institute of Transport and Automation Technology, Leibniz, Unive.*

(Continued)

*Primary Examiner* — Jean Paul Cass
(74) *Attorney, Agent, or Firm* — Hugh P. Gortler

(57) ABSTRACT

A transit system includes a road, a plurality of pavement markers spaced apart along a lane line of the road, and a plurality of RF devices carried by the pavement markers. The RF devices are configured to transmit RF navigation signals to motor vehicles traveling along the road.

26 Claims, 7 Drawing Sheets

(56) References Cited

U.S. PATENT DOCUMENTS

| | | | |
|---|---|---|---|
| 2009/0256723 A1* | 10/2009 | Peddie | E01F 9/559 |
| | | | 340/907 |
| 2010/0052971 A1* | 3/2010 | Amarillas | G01S 13/885 |
| | | | 342/22 |
| 2011/0304452 A1* | 12/2011 | Lickfelt | B60C 23/0461 |
| | | | 340/447 |
| 2012/0290150 A1 | 11/2012 | Doughty et al. | |
| 2014/0010545 A1* | 1/2014 | Berry | H02J 7/35 |
| | | | 398/115 |
| 2014/0304351 A1* | 10/2014 | Davis | G01S 5/10 |
| | | | 709/208 |
| 2015/0019098 A1 | 1/2015 | Schraebler et al. | |
| 2016/0366543 A1* | 12/2016 | Berry | H04W 40/02 |
| 2017/0005717 A1* | 1/2017 | Berry | H04W 36/32 |
| 2017/0110022 A1* | 4/2017 | Gulash | G09B 5/06 |
| 2017/0288722 A1* | 10/2017 | Berry | H04W 4/44 |
| 2017/0289821 A1* | 10/2017 | Berry | G01S 13/92 |
| 2017/0345296 A1* | 11/2017 | Dukish | G08G 1/096783 |

OTHER PUBLICATIONS

Unnamed, Taoglas launches first cellular road marker antenna the RG.01 (https://www.taoglas.com/taoglas-launches-first-cellular-road-marker-antenna-the-rg-01/) Oct. 14, 2013.*

NPL, Bouzakis, et al., Position Tracking for Passive UHF RFID Tags with the Aid of a Scanned Array Int J Wireless Inf Networks (2013) 20:318-327 (Mar. 26, 2013).*

"Passive UHF RFID at 155 Mph," https://www.youtube.com/watch?v=f4bDxy3wlzM.

Chen et al., "A Passive UHF RFID Tag Antenna for Road Marker Navigation Application," IEEE International Symposium on Antennas and Propagation, pp. 1752-1753 (Jul. 19, 2015).

Enzhan Zhang et al., "Active RFID Positioning of Vehicles in Road Traffic," Communications and Information Technologies (ISCIT), 2011 11th International Symposium On, IEEE (Oct. 12, 2011).

* cited by examiner

FIG. 3A
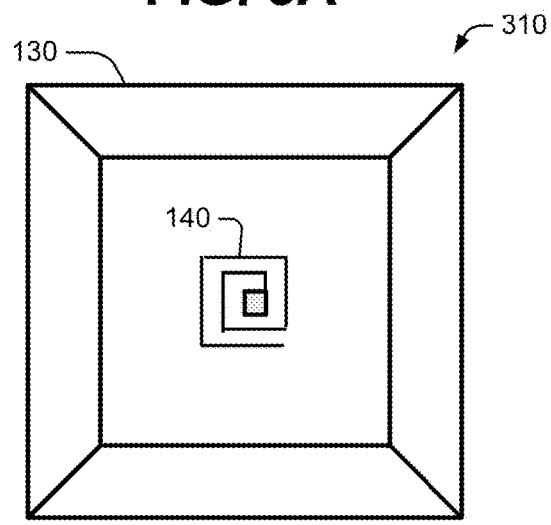
FIG. 3C
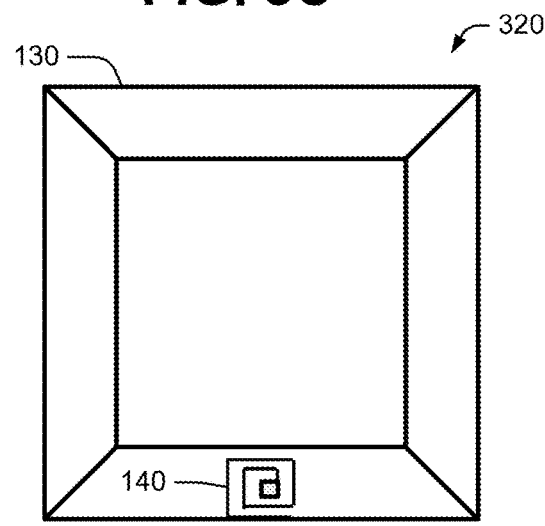
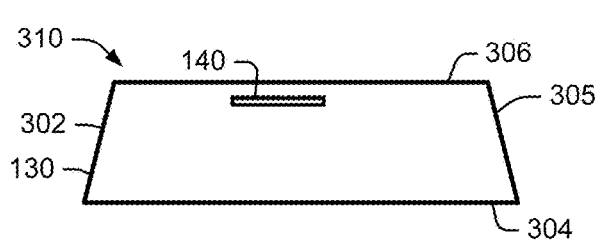
FIG. 3B
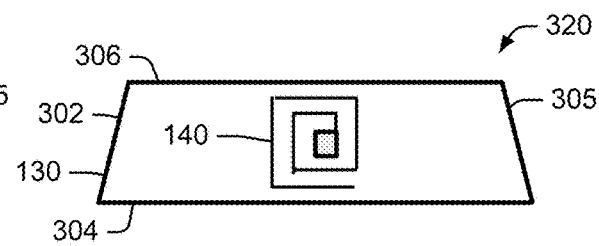
FIG. 3D
FIG. 3E
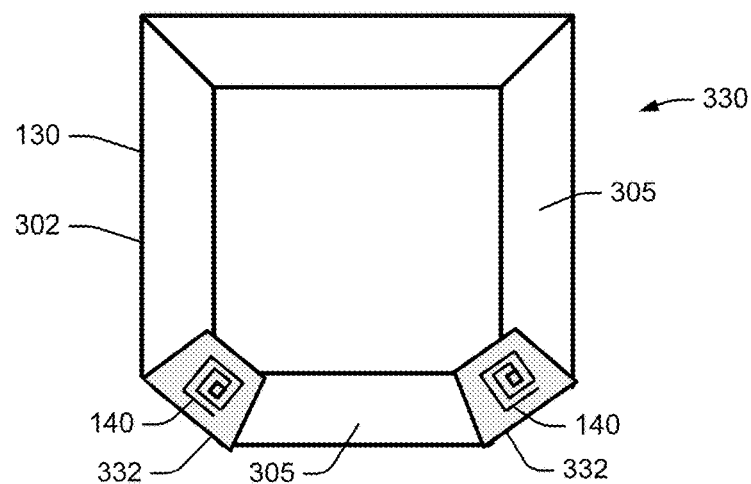

NAVIGATION INFRASTRUCTURE FOR MOTOR VEHICLES

BACKGROUND

A self-driving vehicle is capable of controlling steering, acceleration, and braking without direct driver input. The input is provided by sensors such as radar, lidar, GPS, odometry, and computer vision.

However, GPS and computer vision have certain drawbacks. Thick fog, smoky conditions, and snow may make it difficult for the computer vision to generate an accurate view of roads and other surroundings. As for GPS, it has accuracy problems for moving vehicles (especially at high speeds) and vehicles in certain locations (e.g., downtown cities, and canyons). In addition, GPS is vulnerable to "spoofing" attacks, which generate false GPS signals. Spoofing attacks can create security and safety issues for self-driving vehicles.

BRIEF DESCRIPTION OF THE DRAWINGS

FIGS. 3A and 3B are illustrations of an apparatus for the transit system, the apparatus including a raised pavement reflector and a mounted RFID device.

FIGS. 3C and 3D are illustrations of an apparatus for the transit system, the apparatus including a raised pavement reflector and a mounted RFID device.

FIG. 3E is an illustration of an apparatus for the transit system, the apparatus including a raised pavement reflector and two mounted RFID devices.

DETAILED DESCRIPTION

Figure 1:
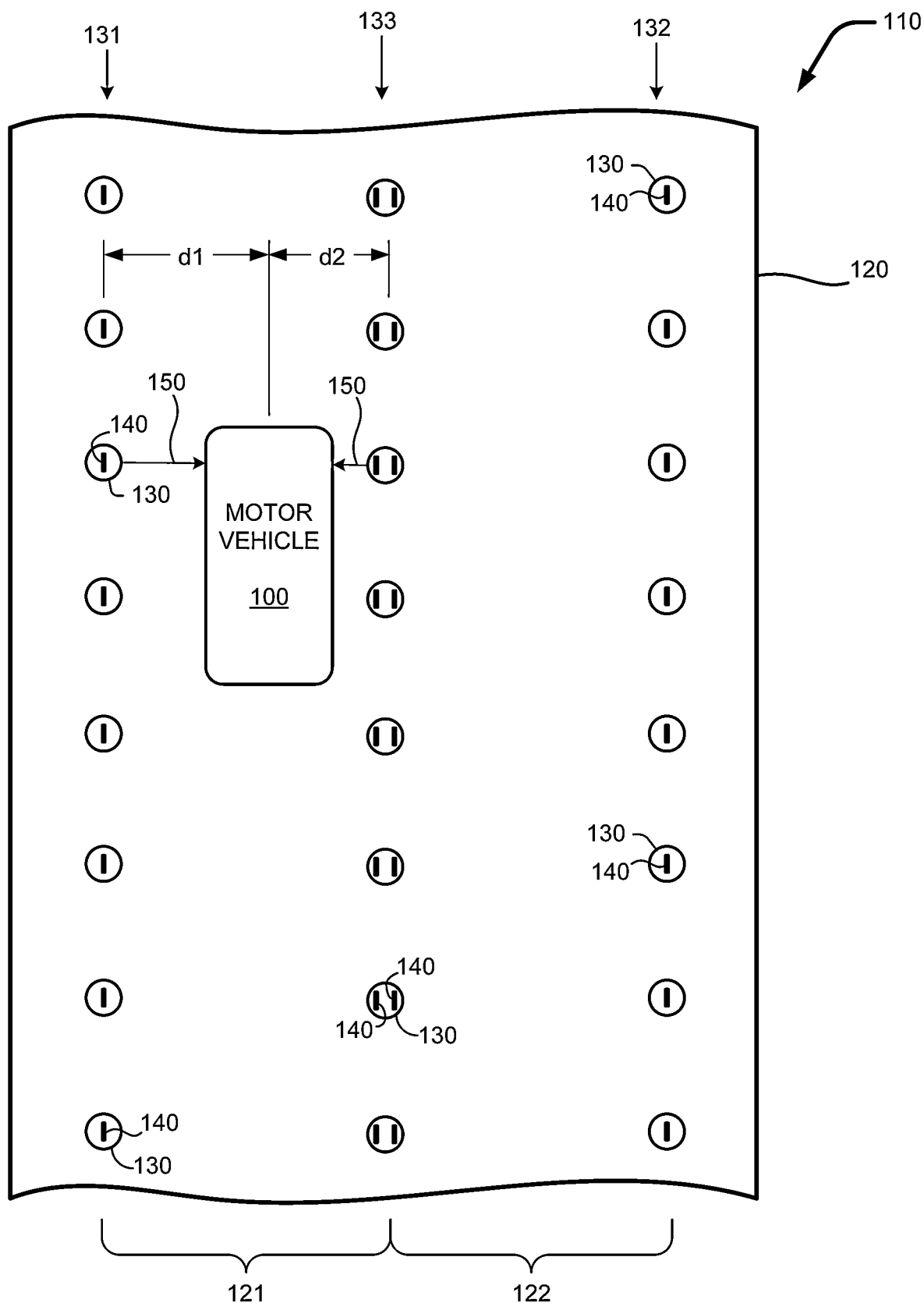
FIG. 1 is an illustration of a transit system for motor vehicles.

Reference is made to FIG. 1, which illustrates a transit system 110 for motor vehicles 100. The transit system 110 includes a road 120, and a plurality of pavement markers 130 spaced apart along the road 120. The pavement markers 130 may be raised, recessed, or embedded in the road 120 (or any combination thereof). Examples of the pavement markers 130 include, without limitation, Bott's dots, raised pavement reflectors, cats eyes, and delineators. The pavement markers 130 may form lane lines 131, 132 and 133, which define lanes 121 and 122 of the road 120.

A plurality of RFID devices 140 are carried by the pavement markers 130. The RFID devices 140 are also spaced apart along the road 120. The RFID devices 140 are configured to generate and transmit RFID navigation signals 150 to motor vehicles 100 traveling down the road 120.

As a motor vehicle 100 approaches or reaches a pavement marker 130, it receives an RFID navigation signal 150 from the RFID device 140 carried by that pavement marker 130. The motor vehicle 100 may process that RFID navigation signal 150 to determine a lateral lane position of the motor vehicle 100. For instance, the motor vehicle 100 may use strength of signal ("SoS") or time of flight ("ToF") of the RFID navigation signal 150 to determine a lateral distance (d1) to a lane line 131. If pavement markers 130 are on opposite sides of the motor vehicle 100 (as illustrated in the example of FIG. 1) and the motor vehicle 100 receives RFID navigational signals 150 from its opposite sides, the motor vehicle 100 may use a differential ToF or a differential SoS to determine the lateral distance (d1-d2) of the motor vehicle 100 from the centerline of its lane 121.

As the motor vehicle 100 continues down the road 120, it receives additional RFID navigation signals 150 and computes a sequence of lateral lane positions. A motor vehicle 100 that is partially or fully automated may use these lateral lane positions to make accurate real time adjustments to the steering of the motor vehicle 100. A vehicle 100 that is not automated may use these lateral lane positions to alert the driver that the motor vehicle 100 is drifting.

At least some of the RFID navigation signals 150 may also be encoded with road information. The encoded road information may include the position of a pavement marker 130 from the center of its associated lane, which enables the distance from the centerline to be determined from only the lateral distance d1. This is beneficial for lanes that are uneven or non-parallel.

The encoded road information may describe a lane border (which can identify the lane in which the motor vehicle 100 is located), indicate the nearest exit and distance to the nearest exit, and provide GPS information about the location of its corresponding pavement marker 130. If the motor vehicle 100 receives RFID navigation signals 150 from opposite sides of a lane, the motor vehicle 100 may use the GPS positions of the pavement markers 130 to calculate the center lane position.

The encoded road information may further include upcoming traffic information such as distances to stop signs, traffic lights, and intersections. The encoded road information may include road topography, such as distance to changes in road curvatures and grades (e.g., the number of feet to the start of a turn with a curvature of a given radius; and the number of feet to the start of downgrade of a certain percentage). Traffic information such as road topography enables the motor vehicle 100 to know what is coming ahead, and plan for turns and other maneuvers.

Different classes of autonomous vehicles may use the RFID navigation signals 150 in different ways. In the United States, the National Highway Traffic Safety Administration (NHTSA) has proposed a formal classification system that involves five levels.

A motor vehicle 100 having a level 0 classification has no automation, but it may issue warnings. For instance, such a motor vehicle 100 may include a processor that processes a sequence of RFID navigation signals 150 to determine whether the motor vehicle 100 is drifting in its lane, and that sounds an audible alarm when drifting occurs (unless a turn signal is activated or the motor vehicle 100 otherwise indicates that it is changing lanes). The encoded road information may be used by a navigation system aboard the motor vehicle 100 (e.g., a built-in navigation system, or a mobile application such as Google Maps Navigation).

A motor vehicle 100 having a level 1 classification has function-specific automation. That is, one or more specific control functions are automated. Examples include electronic stability control or pre-charged brakes, where the motor vehicle 100 automatically assists with braking to enable the driver to regain control of the motor vehicle 100 or stop faster than possible by acting alone. A motor vehicle 100 having a level 1 classification may utilize the RFID navigations signals 150 in the same manner as a motor vehicle 100 having a level 0 classification.

A motor vehicle 100 having a level 2 classification has combined function automation. At least two primary control functions are designed to work in unison to relieve the driver of control of those functions. An example is adaptive cruise control in combination with lane centering. A motor vehicle 100 having a level 3 classification has limited self-driving automation. In such a motor vehicle 100, a driver can fully cede control of all safety-critical functions in certain conditions. Such a motor vehicle 100 can sense when conditions require the driver to retake control and can provide a "sufficiently comfortable transition time" for the driver to do so. For instance, the steering is performed by the vehicle's control until the driver retakes control.

A motor vehicle 100 having a level 2 classification or a level 3 classification may utilize the RFID navigational signals 150 to determine lateral lane positions and use the lateral lane positions to adjust steering in real time to maintain the position of the motor vehicle 100 in its lane. Even if the lane lines are obscured by snow, fog, or other environmental factors, the vehicle position may be maintained without ceding control to the driver.

A motor vehicle 100 having a level 3 classification may use the road information encoded in the RFID navigation signals 150 to set longer warning times when encountering road situations where the motor vehicle 100 needs to cede control to the driver. For instance, if the encoded road information indicates upcoming road work and lane closures, or sharp turns in the road ahead, the motor vehicle 100 can warn the driver that it will cede control in a comfortable time period, rather than ceding in an urgent manner when it encounters road conditions that it is unable to navigate safely.

A motor vehicle 100 having a level 4 classification has full self-driving automation. Destination or navigation input is provided at the beginning of a trip, but a driver is not expected to be available for control at any time during the trip. Thus, such a motor vehicle 100 may be driverless, and it may be occupied or unoccupied. A motor vehicle having a level 4 classification may utilize the RFID navigations signals 150 in the same manner as a vehicle having a level 3 classification, except that control is not ceded at any time to a driver. Thus, a motor vehicle 100 having a level 4 classification can use the RFID navigational signals 150 to maintain vehicle lane position, and it can use the encoded road information to plan for upcoming turns (e.g., reducing speed for an upcoming sharp turn), exits, lane changes, and other driving maneuvers, and plot a driving path.

The RFID devices 140 may be passive, active or any combination thereof. Active RFID devices 140 include their own power source, or they draw power from a power source carried by its corresponding pavement marker 130. For instance, the pavement marker 130 may carry a battery, or it may carry solar cells.

Active RFID devices 140 may periodically generate RFID navigation signals 150. They may also have a greater transmit range than passive RFID devices 140. Range of the RFID navigation signals 150 is typically a function of such factors as transmit power, receive sensitivity and efficiency, antenna, frequency, device orientation, and surroundings.

Passive RFID devices 140 harvest power from interrogator signals to generate and transmit the RFID navigation signals 150. (As used herein, passive RFID devices 140 include semi-passive devices, which also harvest power from the interrogator signals.) The range, strength and frequency of the interrogator signals may depend in part upon speed of the motor vehicle 100 and distance (along a lane) between pavement markers 130. The interrogator signals may be transmitted in a forward direction. For the transit system 110 of FIG. 1, as a motor vehicle 100 traveling along the road 120 may broadcast interrogator signals in a forward direction. An RFID device 140 ahead of the motor vehicle 100 receives an interrogator signal and responds by transmitting an RFID navigation signal 150. The motor vehicle 100 receives the navigation signal 150 as it approaches or reaches the RFID device 140.

At any given time, the motor vehicle 100 may receive RFID navigation signals 150 from more than one RFID device 140. As mentioned above, the motor vehicle 100 may receive RFID navigation signals 150 on opposite sides. The motor vehicle 100 may receive RFID navigation signals 150 from an adjacent pavement marker 130 and at least one pavement marker 130 further up the road 120.

There is no need for each pavement marker 130 to carry an RFID device 140. If pavement markers 130 are clustered together, only one or a few of the pavement markers 130 in the cluster may carry an RFID device 140. Even if the pavement markers 130 are not clustered, every $n^{th}$ pavement marker 130 along a lane may carry an RFID device 140 (where integer n>1).

The example of FIG. 1 shows a road 120 having two lanes 121 and 122, two outer lane lines 131 and 132 of pavement markers 130, and a middle lane line 133 of pavement markers 130. However, the transit system 110 is not so limited. Other roads 120 may have different numbers of lanes and lane lines. For instance, a road 120 might have a single lane and a single line of pavement markers 130.

More than one RFID device 140 may be carried by a pavement marker 130. For instance, the pavement markers 130 forming the middle lane line 133 may carry two RFID devices 140: one for transmitting an RFID navigation signal 150 into the left lane 121, and the other for transmitting an RFID navigation signal 150 into the right lane 122 (in contrast, each of the pavement markers 130 forming the outer lane lines 131 and 132 may carry only a single RFID device 140). The RFID device 140 may direct their RFID navigation signals 150 at an angle that maximizes the signal from the desired lane, and minimizes the signal from the undesired lane.

The transit system 110 is not limited to pavement markers 130. A pavement marker 130 is but one type of roadside marker. Other types of roadside markers may be used instead of, or in addition to, the pavement markers 130. For instance, the RFID devices 140 may be carried by roadside markers such as guard rails and k-rails.

FIGS. 2A to 2F illustrate three different examples 210, 220 and 230 of an apparatus including a pavement marker 130 and at least one embedded RFID device 140. In each example 210, 220 and 230, the pavement marker 130 is a Bott's dot. A typical Bott's dot is semi-hemispherical. A flat surface of the Bott's dot is secured to the road 120. At least one RFID device 140 is embedded within the Bott's dot. For illustrative purposes, FIGS. 2A-2F show the Bott's dots as being made of translucent material, whereby the RFID devices 140 are visible. In practice, however, the Bott's dots are typically made of ceramic or plastic. RF signals penetrate both ceramic and plastic in the length scales of Bott's dots.

Orientation of the RFID device 140 within the Bott's dot may be characterized by a mounting angle. The RFID device may be oriented parallel to (facing) the flat surface of the Bott's dot (mounting angle=0 degrees), it may be oriented perpendicular (edge-wise) to the flat surface (mounting angle=90 degrees), or it may be oriented at some mounting angle between 0 and 90 degrees.

The pavement marker 130 may have markings to allow it to be installed at a known orientation with respect to the lane line. In this known orientation, the RFID navigation signal 150 is transmitted perpendicular to the lane line and across the road (as illustrated in FIG. 1). The RFID navigation signal 150 is received as the motor vehicle 100 reaches the pavement marker 130. At this orientation, the RFID device 140 is said to have a transmission angle of 0 degrees. At a non-zero transmission angle, the RFID navigation signal 150 is directed towards the motor vehicle 100 as the motor vehicle 100 is approaching (but has not yet reached) the pavement marker 130.

Figure 2A:
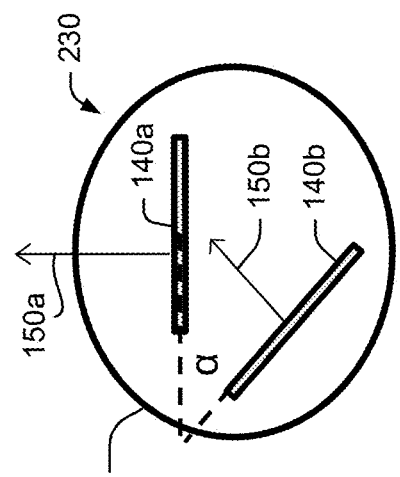
FIGS. 2A and 2B are illustrations of an apparatus for the transit system, the apparatus including a Bott's dot and an embedded RFID device at a first mounting angle.
Figure 2C:
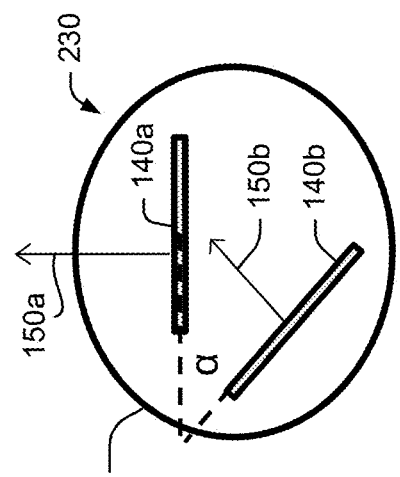
FIGS. 2C and 2D are illustrations of an apparatus for the transit system, the apparatus including a Bott's dot and an embedded RFID device at a second mounting angle.
Figure 2E:
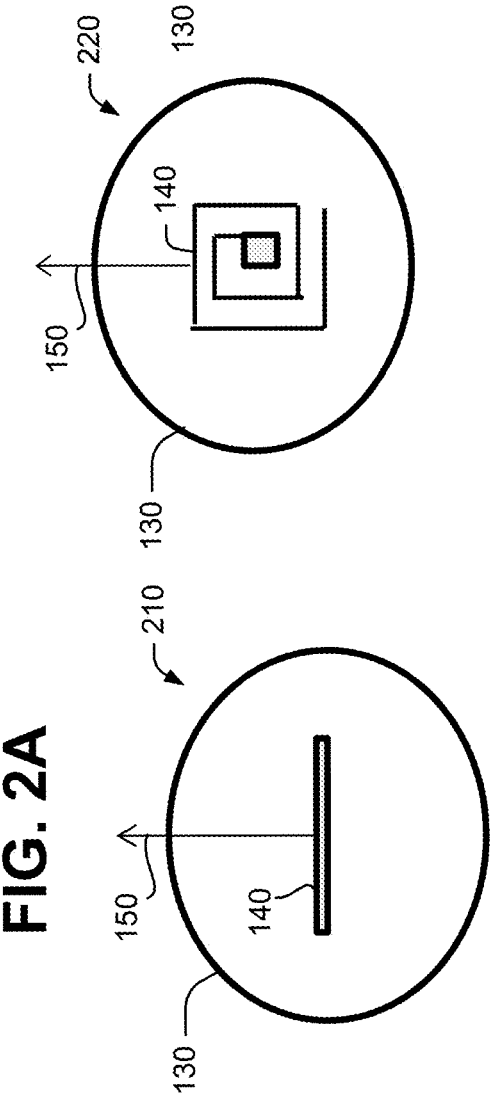
FIGS. 2E and 2F are illustration of an apparatus for the transit system, the apparatus including a Bott's dot and embedded first and second RFID devices at different transmission angles.
Figure 2B:
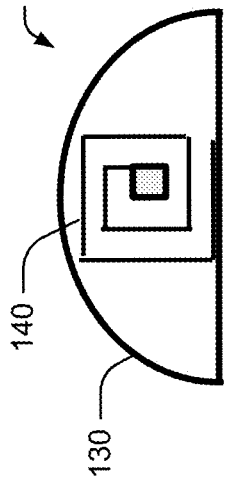

FIGS. 2A and 2B illustrate top and side views, respectively, of the first example 210. The RFID device 140 is oriented at a mounting angle of 90 degrees, and its transmission angle is roughly 0 degrees.

Figure 2D:
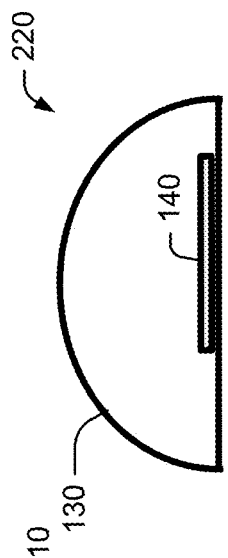

FIGS. 2C and 2D illustrate top and side views, respectively, of the second example 220. The RFID device 140 is oriented at a mounting angle of 0 degrees, and the transmission angle is roughly 0 degrees.

Figure 2F:
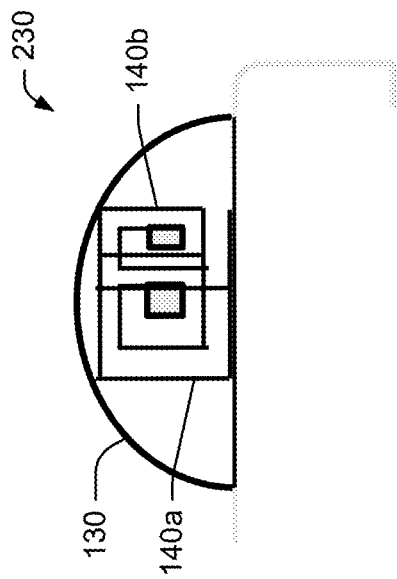

FIGS. 2E and 2F show top and side views, respectively, of the third example 230, in which the Bott's dot carries a first RFID device 140a having a short transmission range, and a second RFID device 140b having a long transmission range. The first RFID device 140a directs its RFID navigation signal 150a at a transmission angle of zero degrees, and the second RFID device directs its navigation signal 150b at a non-zero transmission angle ($\alpha$). The navigation signal 150a transmitted by the first RFID device 140a is received by motor vehicles 100 close to the pavement marker 130 and are used primarily to determine the lateral lane position. The RFID navigation signal 150 transmitted by the second RFID device 140b is received by motor vehicles 100 further away and are used primarily to provide encoded road information.

In North America, the first RFID device 140a may transmit at, for example, 902-928 MHz UHF ISM band, which can be adjusted to cover about 1 to 12 meters; and the second RFID device 140b may transmit at 433 MHz, which can be adjusted to cover about 1 to 100 meters. In Europe, the first RFID device 140a may transmit at 865-868 MHz UHF ISM band, and the second RFID device 140b may transmit at 433 MHz.

FIGS. 3A to 3E illustrate three additional examples 310, 320 and 330 of an apparatus including a pavement marker 130 and at least one embedded RFID device 140. In each additional example 310, 320 and 330, the pavement marker 130 is a raised pavement reflector. The raised pavement reflector includes a reflector body 302 that is shown as being made of a translucent material (for illustrative purposes), but is typically made of plastic or ceramic. A bottom planar surface 304 of the reflector body 302 is secured to the road. The reflector body 302 also has angled surfaces 305 and an upper planar surface 306. The angled surfaces 305 of the reflector body 302 may be coated with reflective material, or reflectors may be epoxied to the angled surfaces 305. The raised pavement reflector may also include a lens or sheeting that covers the angled surfaces 305. The lens or sheeting enhances visibility by reflecting automotive headlights. At least one RFID device 140 may be mounted beneath the angled and upper surfaces 305 and 306. If reflectors are epoxied to the reflector body 302, an RFID device 140 may instead be embedded in the epoxy.

FIGS. 3A and 3B illustrate top and side views, respectively, of the first additional example 310. The RFID device 140 is mounted underneath the upper planar surface 306 at a mounting angle of roughly 0 degrees (roughly parallel to the upper planar surface 306). The position of the RFID device 140 shown in FIGS. 3A and 3B is not limiting. The RFID device 140 may be mounted at another mounting angle and may be positioned at another distance from within the reflector body 302.

FIGS. 3C and 3D illustrate top and side views, respectively, of the second additional example 320. The RFID device 140 is surface mounted underneath one of the angled surface 305 of the reflector body 302. Mounting angle is between 0 and 90 degrees.

The raised pavement reflector may have a rectangular geometry, but it is not so limited. For instance, corners of the raised pavement reflector may be cut on the corners facing oncoming motor vehicles 100.

FIG. 3E illustrates a top view of the third additional example 330, in which the reflector body 302 is cut on corners 332 facing oncoming motor vehicles 100. An RFID device 140 is mounted underneath each cut corner 332 The RFID devices 140 are oriented to face adjacent lanes. This creates a higher signal to and from the antenna.

Another example of a pavement marker 130 (not illustrated) is a "cat's eye," which may include two pairs of reflective glass spheres set into a flexible white rubber dome, mounted in a metal housing. The rubber dome may be occasionally deformed by passing traffic. One or more RFID devices 140 may be embedded in the spheres or attached to the metal housing.

Another example of a pavement marker 130 (not illustrated) is a "delineator." A delineator is a tall pylon (similar to a traffic cone or bollards) mounted on a road surface, or along an edge of a road. Delineators are typically used to channelize traffic. One or more RFID devices 140 may be attached to the pylon.

The RFID devices 140 may be embedded in or mounted to the pavement markers 130 at the time of manufacture of the pavement markers 130. However, pavement markers 130 already on a road may be retrofitted to include the RFID devices 140. A pavement marker 130 may be retrofitted, for instance, by boring a small hole, embedding the RFID device 140 in the hole, and either filling the hole with epoxy or covering the hole with tar or another material.

As mentioned above, the RFID devices 140 may be carried by roadside markers such as guard rails and k-rails. The RFID devices 140 may be attached to the surface of k-rails or embedded in the k-rail material at the time of manufacture. The RFID devices 140 may be mounted on housings on the posts of the guard rails, or on another surface. The RFID devices 140 may be embedded in the posts, for example, by boring holes in the posts and inserting the RFID devices 140, with or without device housings.

Figure 4:
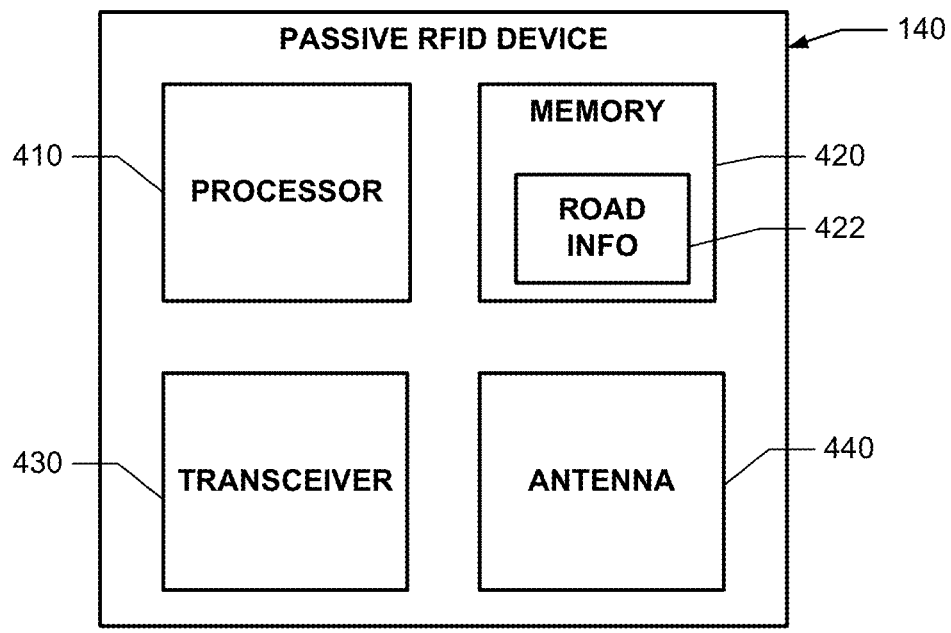
FIG. 4 is an illustration of a passive RFID device for the apparatus

Reference is made to FIG. 4, which illustrates functional components of a passive RFID device 140 including a processor 410, machine-readable memory 420, transceiver 430, and antenna 440. Road information 422 may be stored in the memory 420. The transceiver 430 receives an interrogator signal, which powers the processor 410 to generate an RFID navigation signal (including encoded road information), and send the RFID navigation signal to the transceiver 430. The transceiver 430 then transmits the RFID navigation signal via the antenna 440. A directional antenna 440 is preferred, but the antenna 440 may be isotropic. Consider the RFID devices 140 along the middle lane line 133 in FIG. 1. They made include two directional antennae or a single isotropic antenna.

The RFID devices 140 may be configured to receive messages or data from RFID printers, and store information contained in those messages or data. For instance, if any exit is closed due to maintenance, this exit closure information may be wirelessly downloaded or printed to the RFID devices in those pavement markers 130 preceding the closed exit.

GPS location may also be printed in the memory 420 of the RFID device 140. By printing the GPS location on the RFID device 140, spoofing can be thwarted because the RFID information is local, and redundant. If a GPS satellite signal is jammed and emulated with false information, the observed GPS satellite information will not agree with the printed GPS information.

Figure 5:
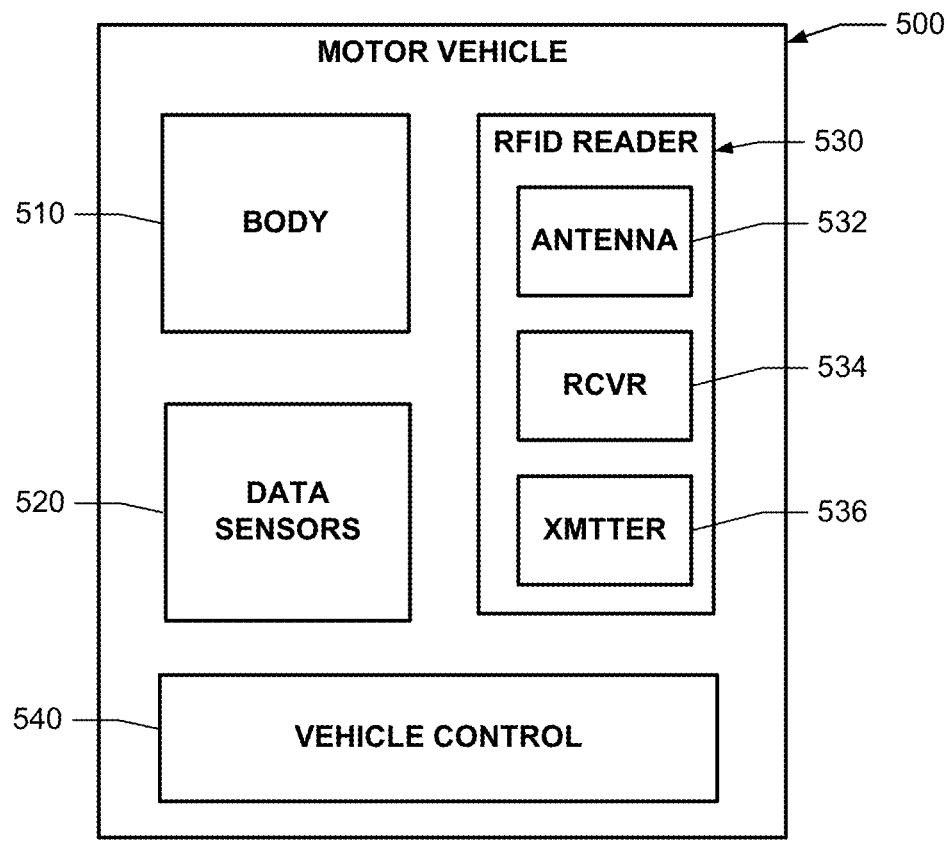
FIG. 5 is an illustration of a motor vehicle for navigating the transit system.

Reference is now made to FIG. 5, which illustrates a motor vehicle 500. Examples of the motor vehicle 500 include, but are not limited to, an automobile, motorcycle, utility vehicle, truck, and transport vehicle (e.g., bus, passenger van).

The motor vehicle 500 includes a body 510, data sensors 520, at least one RFID reader 530, and a vehicle control 540. (Other elements of the motor vehicle 500, including the engine and drive train, are not illustrated.) In the case of a motorcycle, the body 510 includes a frame. In the case of an automobile, the body 510 includes a chassis and an outer shell attached to a chassis.

The vehicle control 540 may be automated (resulting in an NHTSA classification of 1 or greater), or it may not be automated (resulting in an NHTSA classification of 0). A vehicle having a level 4 classification may be driverless.

The data sensors 520 generate sensory data for the motor vehicle control 540. Examples of the data sensors 520 include, but are not limited to, radar, lidar, GPS, odometry, and computer vision. The vehicle control 540 may use this sensory data for various functions including, but not limited to, distinguishing between different cars on the road, identifying signs, planning appropriate navigation paths, and collision avoidance.

The RFID reader 530 includes an antenna 532 mounted to the body 510 at a location for capturing the RFID navigation signals during movement of the motor vehicle 500. The RFID reader 530 further includes an RFID receiver 534 for processing the captured RFID navigation signals to determine a lateral lane position of the motor vehicle 500 during movement of the motor vehicle 500. The RFID receiver 534 may also extract encoded road information from the captured RFID navigation signals.

The RFID reader 530 may be active or passive. If the RFID devices are active, the RFID reader 530 may be passive or active. If the RFID devices are passive, then the RFID reader 530 may be active. The vehicle 500 may supply power to an RFID reader 530 that is active. An RFID reader 530 that is active may also have a transmitter 536 for transmitting interrogator signals via the antenna 532 during movement of the motor vehicle 500.

The RFID reader 530 of FIG. 5 is illustrated in terms of functionality. The receiver 534 and the transmitter 536 may be integrated into a single transceiver, or they may be implemented as separate components. The receiver 534 and the transmitter 536 may have separate processing capability, or they may share a common processor. The RFID reader 530 may contain more than one receiver and one transmitter, which may operate at the same or different frequencies.

Figure 6:
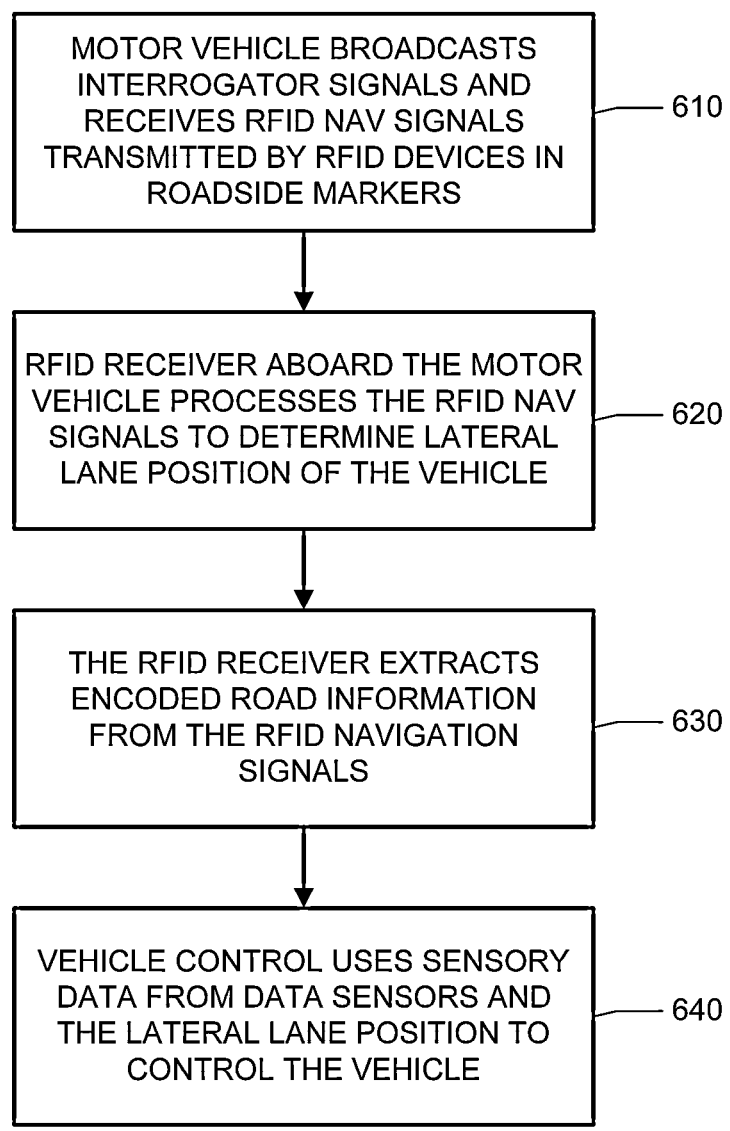
FIG. 6 is an illustration of a method of operating the motor vehicle of FIG. 5.

Additional reference is made to FIG. 6, which illustrates a method in which the motor vehicle 500 is controlled to move along a road marked with roadside markers. At least some of the roadside markers carry active RFID devices 140 and/or passive RFID devices that broadcast RFID navigation signals when interrogated.

At block 610, as the motor vehicle 500 moves along the road in a forward direction, it broadcasts interrogator signals and it receives RFID navigation signals transmitted by the interrogated RFID devices 140. The interrogator signal may be broadcast continuously or in timed radio pulses.

At block 620, the RFID receiver 534 processes the RFID navigation signals to determine lateral lane position of the motor vehicle 500. If the RFID navigation signals are received from only one side of a lane, absolute distance from a lane line may be determined. If the RFID navigation signals are received from opposite sides of a lane, a differential signal can be used to determine the distance from the lane's centerline.

The processing of the RFID navigation signals may also include measures to prevent false information or interference from other vehicles on the road. For instance, the motor vehicle 100 has an identifier and/or identifying handshaking signal (e.g., a series of short or long pulses), which are reflected by the roadside markers. Thus, the RFID reader 530 only listens to the navigation signal returned in response to the handshaking signal.

At block 630, the RFID receiver 534 may also extract any encoded road information from the RFID navigation signals.

At block 640, the vehicle control 540 uses sensory data from the data sensors 520 and the lateral lane position from the RFID reader 530 to control the motor vehicle 500. For example, an automated vehicle control 540 can use the lateral lane position to steer the motor vehicle 500 (e.g., center the motor vehicle 500 in a lane), and it can use the road information to plan for upcoming maneuvers and plot a driving path. The vehicle control 540 can use information such as identification of next exit, and distance to next exit, to safely execute lane changes to position the motor vehicle 500 to take the exit when it approaches the exit. It can use information such as lane closures to navigate the motor vehicle 500 to lanes that are open to traffic.

In some instances, the RFID reader 530 may determine optimal frequency or period of interrogation as a function of distance between pavement markers and speed of the motor vehicle 500. The distance may be known in advance, or the distance may be determined in real time (e.g., from the time of flight or GPS location information broadcast from the roadside markers). If the roadside markers are x feet apart, and the motor vehicle 500 is moving at a speed of y feet per second, then the interrogation signal may be broadcast at an optimal period of once per x/y seconds. If the distance is not known in advance, the interrogation signals may be broadcast at a high frequency to determine the position of the highest signal detected from the roadside markers, and then adjust the interrogation frequency to the optimal frequency.

The motor vehicle 500 may have one or more of the RFID readers 530 for generating the interrogation signals and capturing the RFID navigation signals. Interrogation by multiple RFID readers 530 delivers more power to passive RFID devices. Interrogation by multiple RFID readers 530 also allows greater control of the angle of the interrogation signal relative to the roadside markers. Whereas a single RFID reader 530 at the front center of the motor vehicle 500 is positioned forward to interrogate both sides of the lane, RFID readers 530 on opposite sides of the motor vehicle 500 may be angled to see the roadside markers coming ahead and can anticipate locations and changes in lane curvature.

Figure 7:
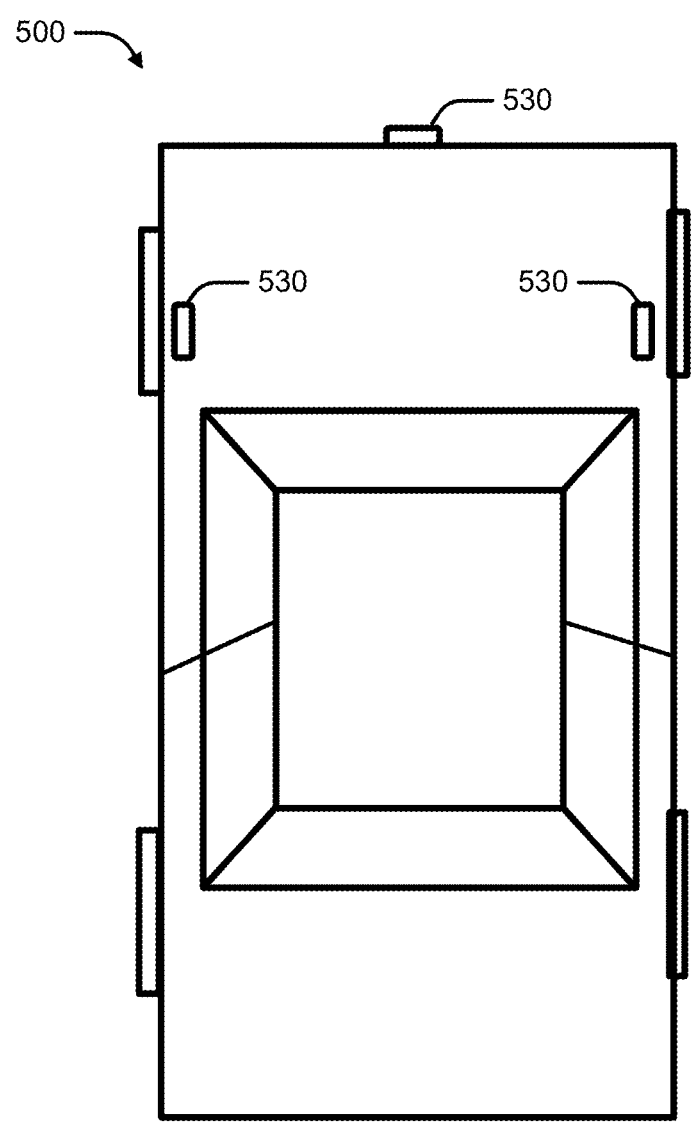
FIGS. 7 and 8 are illustrations of different configurations of the motor vehicle of FIG. 5.
Figure 8:
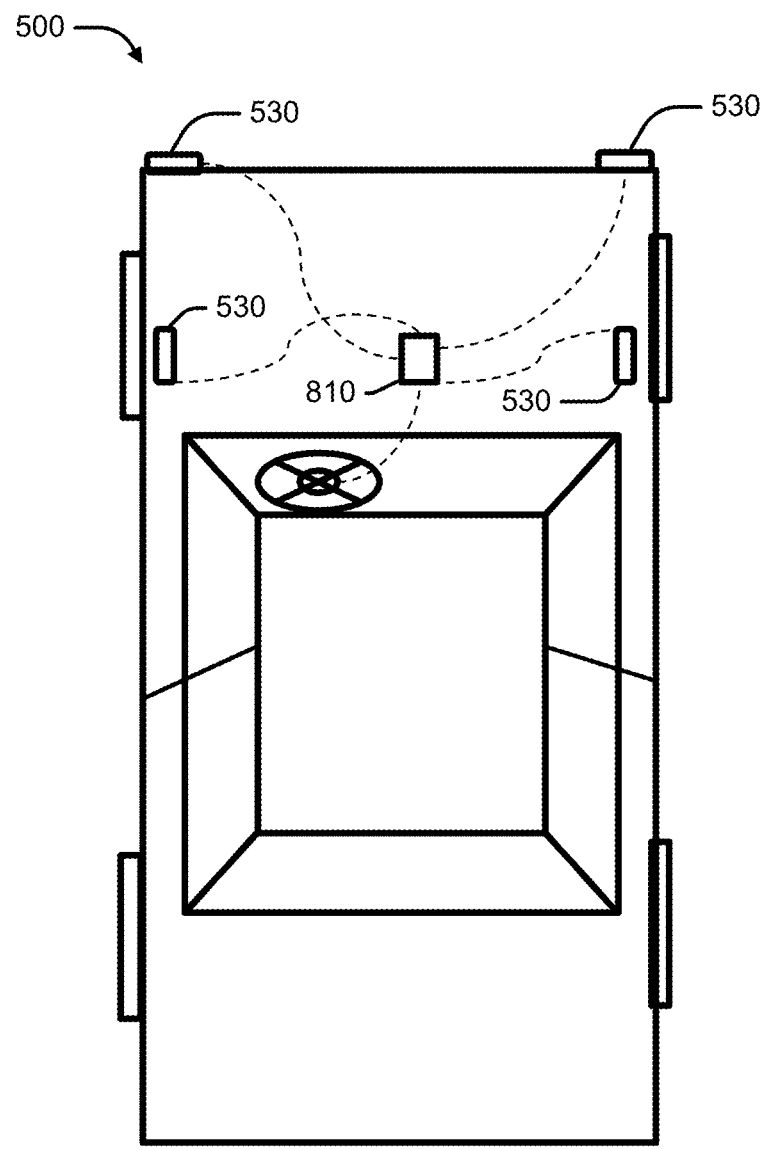

FIGS. 7 and 8 illustrate different configurations of the motor vehicle 500. In the configuration of FIG. 7, an RFID reader 530 is mounted to the front center of the motor vehicle 500, and two other RFID readers 530 are mounted on the opposite sides of the motor vehicle 500 (e.g., in wheel wells of the motor vehicle 500). In the configuration of FIG. 8, two RFID readers 530 are mounted to the front of the motor vehicle 500, and two other RFID readers 530 are mounted on the opposite sides of the motor vehicle 500. These configurations enable multiple interrogations in a forward direction.

In the configuration of FIG. 8, the RFID readers 530 do not process the received RFID signals. Instead, the RFID readers 530 are electrically connected to a shared processor 810, which performs the processing. The shared processor 810 may or may not share other vehicle functions such as steering, braking, navigation calculation, GPS positioning, etc.

The motor vehicle 500 is not limited to the configurations illustrated in FIGS. 7 and 8. In another configuration, the motor vehicle 500 may have only a single RFID reader 530 located at the front. In yet another configuration, the motor vehicle 500 may have only RFID readers 530 on opposite sides. In still another configuration, the motor vehicle 500 may have one or more RFID readers 530 mounted at the back of the motor vehicle 500. Other configurations may have additional RFID readers 530 at strategic locations for better signal reception.

In other configurations of the motor vehicle 500, the RFID readers 530 may be placed at other positions from which they can interrogate and receive the RFID navigation signals from the RFID devices in the roadside markers. For instance, there may be ports intentionally designed into the body 510 of the motor vehicle 500 for the express purpose of mounting the RFID readers 530.

Thus disclosed is an infrastructure that can immediately provide local position information to autonomous motor vehicles. The infrastructure utilizes existing roadside markers, with only minor modifications to those roadside markers. It does not depend upon uniform width of the roads.

The infrastructure provides advantages over computer vision and GPS. The RFID environment is better suited than GPS for detecting lateral lane position of fast-moving vehicles. It is better suited than computer vision for detecting lateral lane position in inclement weather and other conditions (e.g., snow, sand, smoke, thick fog, white out conditions) that obscure lane lines and other road details. Thus, the infrastructure creates much greater safety for autonomous vehicles in both normal and difficult conditions.

A transit system herein is not limited to standard RFID devices 140. RFID devices 140 that differ from the standard may be used. For instance, the non-standard RFID device operates similar to a standard RFID device, but may communicate over non-standard radio frequencies (e.g., special frequencies slotted for autonomous navigation). In this case the first and second RFID devices 140*a* and 140*b* may broadcast at frequencies to be reserved by the International Organization for Standardization for navigational systems. The RFID devices 140 may have different nomenclature. Other aspects of the standard RFID device may be altered including, but not limited to, range, memory size, and memory configurations.

A transit system herein is not even limited to RFID devices 140. The RFID devices 140 described herein are but one type of RF device. The roadside markers may carry other types of RF devices instead of, or in addition to, RFID devices 140. These other types of RF devices include, but are not limited to, WiFi devices, Bluetooth devices, and ZigBee® devices.

The RF devices generate and transmit RF navigation signals. The RFID navigation signal 150 is a type of signal generated and transmitted by RFID devices 140.

The invention claimed is:

1. An apparatus comprising:
    a raised pavement marker configured to be mounted to a road at a lane line of a lane at known orientation with respect to the lane line; and
    an RF device carried by the raised pavement marker, the device configured to transmit directional RF navigation signals and positioned relative to the known orientation to transmit the signals across the lane in a direction that is substantially normal to the lane line.

2. The apparatus of claim 1, wherein the RF device is a passive RFID device that is configured to respond to an interrogator signal.

3. The apparatus of claim 1, wherein the RF device is configured to include encoded road information in the RF navigation signals.

4. The apparatus of claim 1, wherein at least one additional RF device is carried by the pavement marker, the at least one additional device also configured to generate RF navigation signals.

5. The apparatus of claim 1, further comprising a second RF device carried by the roadside marker, wherein the second RF device has a non-zero transmission angle.

6. The apparatus of claim 1, wherein the RF device is mounted to the pavement marker at a non-zero degree mounting angle.

7. The apparatus of claim 1, wherein the raised pavement marker includes a Bott's dot, the Botts dot having markings for installation at the known orientation and wherein the RF device includes a passive RFID device embedded within the Bott's dot relative to the markings.

8. The apparatus of claim 1, wherein the raised pavement marker includes a raised pavement reflector, and wherein the RF device includes a passive RFID device mounted underneath a surface of the raised pavement reflector.

9. The apparatus of claim 1, wherein the RF device includes memory encoded with road information, the RFID device configured to generate the RF navigation signal including the encoded road information.

10. A system for lateral lane positioning of vehicles on a road, the system comprising:
    a plurality of raised pavement markers mounted to the road at lane lines; and
    a plurality of passive RFID devices embedded within at least some of the pavement markers, each of the passive RFID devices configured to transmit a directional RFID navigation signal across the road at a transmission angle of only zero degrees with respect to its associated lane line.

11. The system of claim 10, wherein the pavement markers include Bott's dots, and wherein the RF devices are embedded within at least some of the Bott's dots.

12. The system of claim 10, wherein the pavement markers include raised pavement reflectors, and wherein the RF devices are within at least some of the raised pavement reflectors.

13. The system of claim 10, wherein at least some of the RF devices include memory encoded with road information and are configured to generate the RF navigation signals having the encoded road information.

14. The system of claim 10, wherein the passive RFID devices are mounted to their raised pavement markers at a non-zero degree mounting angle.

15. The system of claim 10, wherein each raised pavement marker is configured with a known orientation with respect to its associated lane line, and wherein each device is positioned relative to the known orientation to transmit the directional RFID signal at the about zero degree transmission angle.

16. A motor vehicle comprising:
a body;
an RFID antenna mounted to the body at a location for receiving RFID navigation signals during movement of the vehicle;
an RFID receiver, mounted on the body, the receiver configured to broadcast interrogation signals in timed radio pulses as a function of distance between pavement markers and speed of the vehicle, and receive RFID navigation signals in response to the interrogation signals, the receiver further configured to process the received RFID navigation signals to determine a sequence of lateral lane distances of the vehicle; and
an vehicle control responsive to changes in the sequence of lateral lane distances for lateral lane positioning of the vehicle.

17. The motor vehicle of claim 16, wherein the motor vehicle has an NHTSA classification level of at least 2, and wherein the vehicle control uses a sequence of the lateral lane distance to adjust steering in real time to maintain lane position of the motor vehicle.

18. The motor vehicle of claim 16, wherein the motor vehicle has an NHTSA classification level of 4, and wherein the vehicle control uses a sequence of the lateral lane distance to adjust steering in real time to maintain lane position of the motor vehicle, and uses encoded road information in the RF navigational signals to plan for driving maneuvers and to plot driving paths.

19. The motor vehicle of claim 16, wherein the motor vehicle has an NHTSA classification level of no more than 1, and wherein the vehicle control uses a sequence of the lateral lane distance to alert a driver when the motor vehicle is drifting.

20. The motor vehicle of claim 16, wherein the antenna is mounted to the body at one of a front and a wheel well of the body.

21. A method comprising controlling a motor vehicle to move along a road having pavement markers along a lane line of a lane of the road, at least some of the pavement markers carrying RFID devices that, when interrogated, transmit directional RFID navigation signals across the lane in a direction normal to the lane line; wherein controlling the motor vehicle includes:

broadcasting interrogation signals in timed radio pulses as a function of distance between the pavement markers and speed of the vehicle;
receiving the RFID navigation signals as the vehicle moves along the lane;
processing the received RFID signals to determine a sequence of lateral distances from the lane line; and
steering the vehicle in response to changes in the sequence of lateral distances to avoid vehicle drift.

22. The method of claim 21, further comprising extracting encoded road information from the received RFID navigation signals and using the encoded road information to plan upcoming driving maneuvers.

23. The method of claim 21, wherein if the distance between the pavement markers is not known, the interrogation signals are broadcasted at a high frequency to determine a maximum signal from the pavement markers, and then that information is used to adjust the timed pulses to coincide with the spacing and speed of the vehicle.

24. The system of claim 10, wherein the plurality of pavement markers are along one side of a lane of the road, the system further comprising a plurality of additional pavement markers spaced apart along an opposing side of the lane and a plurality of additional RF devices carried by the additional pavement markers, wherein each of the additional RF devices is configured to transmit a directional RF navigation signal across the lane at a zero degree transmission angle.

25. The motor vehicle of claim 16, wherein:
the RFID receiver is configured to receive the RFID navigation signals from opposite sides of the motor vehicle, and use a differential time of flight or a differential strength of signal to determine the sequence of lateral lane distances.

26. The method of claim 21,
wherein the lane line is at one side of the lane;
wherein the road also has additional pavement markers along a lane line at an opposite side of the lane, at least some of the additional pavement markers carrying additional RFID devices that transmit additional directional RFID navigation signals across the lane;
wherein the method further includes interrogating and receiving the additional RFID navigation signals from the additional RFID devices; and processing the received additional RFID signals to determine a sequence of lateral distances from the lane line at the opposite side; and
wherein the vehicle is instead steered in response to differences in the lateral distances of both sequences to avoid vehicle drift.

* * * * *